United States Patent [19]

Drennen et al.

[11] Patent Number: 5,113,987

[45] Date of Patent: May 19, 1992

[54] FLUID RETURN CHANNELS FOR A COVER OF A VISCOUS FLUID CLUTCH

[75] Inventors: David B. Drennen, Bellbrook; Ronald G. Huth, Huber Heights; David M. Hudson, Kettering, all of Ohio

[73] Assignee: General Motors Corporation, Detroit, Mich.

[21] Appl. No.: 651,875

[22] Filed: Feb. 7, 1991

[51] Int. Cl.$^5$ .................. F16D 31/02; F16D 43/25
[52] U.S. Cl. .................. 192/58 B; 192/82 T
[58] Field of Search .................. 192/58 B, 82 T

[56] References Cited

U.S. PATENT DOCUMENTS

| Re. 30,608 | 5/1981 | Bopp | 192/58 B |
|---|---|---|---|
| 3,404,832 | 10/1968 | Sutaruk | 192/58 B X |
| 3,559,786 | 2/1971 | Long, Jr. | 192/58 |
| 3,648,811 | 3/1972 | La Flame | 192/58 B |
| 4,086,990 | 5/1978 | Spence | 192/58 B |
| 4,544,053 | 10/1985 | Yamaguchi et al. | 192/58 B |
| 4,779,323 | 10/1988 | Bloemendal | 192/82 T X |
| 4,974,712 | 12/1990 | Brown | 192/58 B |

Primary Examiner—Allan D. Herrmann
Assistant Examiner—Nicholas Whitelaw
Attorney, Agent, or Firm—A. Michael Tucker

[57] ABSTRACT

A viscous fluid clutch includes an internally-mounted pump plate for separating a working chamber from a reservoir. Fill openings in the pump plate permit fluid flow from the reservoir to the working chamber. Orifices in the pump plate direct return flow back to the reservoir. Fluid accumulators formed in a cover are aligned with each of the pump plate orifices. A non-radical channel formed in the cover begins at a respective accumulator and terminates at an inner reservoir chamber. Centripetal forces of the rotating clutch pump fluid from the accumulators to the reservoir. The geometry of the channels prevents migration of fluid from the reservoir to the working chamber without the use of mechanical valves when the clutch is at rest.

7 Claims, 3 Drawing Sheets

FLUID RETURN CHANNELS FOR A COVER OF A VISCOUS FLUID CLUTCH

BACKGROUND OF THE INVENTION

1. Field of the Invention viscous fluid drive device. In particular, the present invention is concerned with fluid return channels formed in a cover of a viscous fluid clutch.

2. Statement of the Related Art

A thermostatically-controlled viscous fluid clutch for driving and rotating a vehicle cooling fan is well-known. A multi-bladed fan is removably secured to a body of the clutch. The fan and clutch assembly are installed between an accessory pulley of a vehicle engine (typically the water pump pulley) and a radiator. The clutch drives the fan at high speeds close to input speed when cooling is required and permits the fan to rotate at low speeds when cooling is not required. Thermostatic control of the fan through the clutch reduces the airflow noise caused by fan rotation and the load on an engine, resulting in horsepower gain and improved fuel economy.

A clutch plate, housed within the clutch, having lands and grooves is mated to the body having complementary lands and grooves. A pump plate divides the interior volume of the clutch into a pair of fluid chambers, a working chamber and a reservoir. Fill openings in the pump plate permit selective flow of a viscous fluid from the reservoir to the working chamber and into a shear zone between the lands and grooves of the body and clutch plate. Fluid shear in the lands and grooves transfers input torque from the clutch plate to drive the body and the attached fan.

When cooling is not required, the fill openings in the pump plate are closed and the fluid in the shear zone is pumped into a pumping chamber. Orifices in the pump plate permit passage of the fluid from the pumping chamber into the reservoir. The removal of a majority of the fluid from the shear zone substantially reduces the shear between the clutch plate and the body, thereby substantially reducing the rotation of the fan.

When an engine is not running, fluid in the reservoir may settle at an equilibrium level in a conventional clutch. Fluid pressure may cause the migration of fluid from the reservoir into the pumping chamber through the pump plate orifices and into the shear zone. When an engine is next started, fluid that has migrated into the shear zone results in annoying high-speed operation of the fan. Such high-speed operation creates unwanted airflow noise from the fan blades. Also, excessive rotation of the fan of a cold engine increases the engine warm-up period.

The art continues to seek improvements. It is desirable that a viscous fluid clutch provide thermostatic operation of a fan when cooling is required. Furthermore, it is desirable that a clutch prevent the migration of fluid from a reservoir to the shear zone when the engine is not in operation, thereby eliminating high-speed operation and unwanted airflow noise when an engine is started.

SUMMARY OF THE INVENTION

The present invention includes a viscous fluid drive device particularly suitable for a fan clutch of a vehicle. The present fan clutch utilizes fluid return channels formed in the cover to prevent the migration of fluid through pump plate orifices from a reservoir into a pumping chamber when the clutch is in a static condition.

In a preferred embodiment, a viscous fluid clutch includes an internally-mounted pump plate for separating a working chamber from a reservoir. Fill openings in the pump plate permit fluid flow from the reservoir to the working chamber. Orifices in the pump plate direct return flow back to the reservoir. Fluid accumulators formed in a cover are aligned with each of the pump plate orifices. A non-radial channel formed in the cover begins at a respective accumulator and terminates at the reservoir. Centripetal forces pump fluid from the accumulators to the reservoir. The geometry of the channels prevents migration of fluid from the reservoir to the working chamber without the use of mechanical valves when the clutch is at rest.

DETAILED DESCRIPTION OF THE PREFERRED EMBODIMENTS

Figure 1:
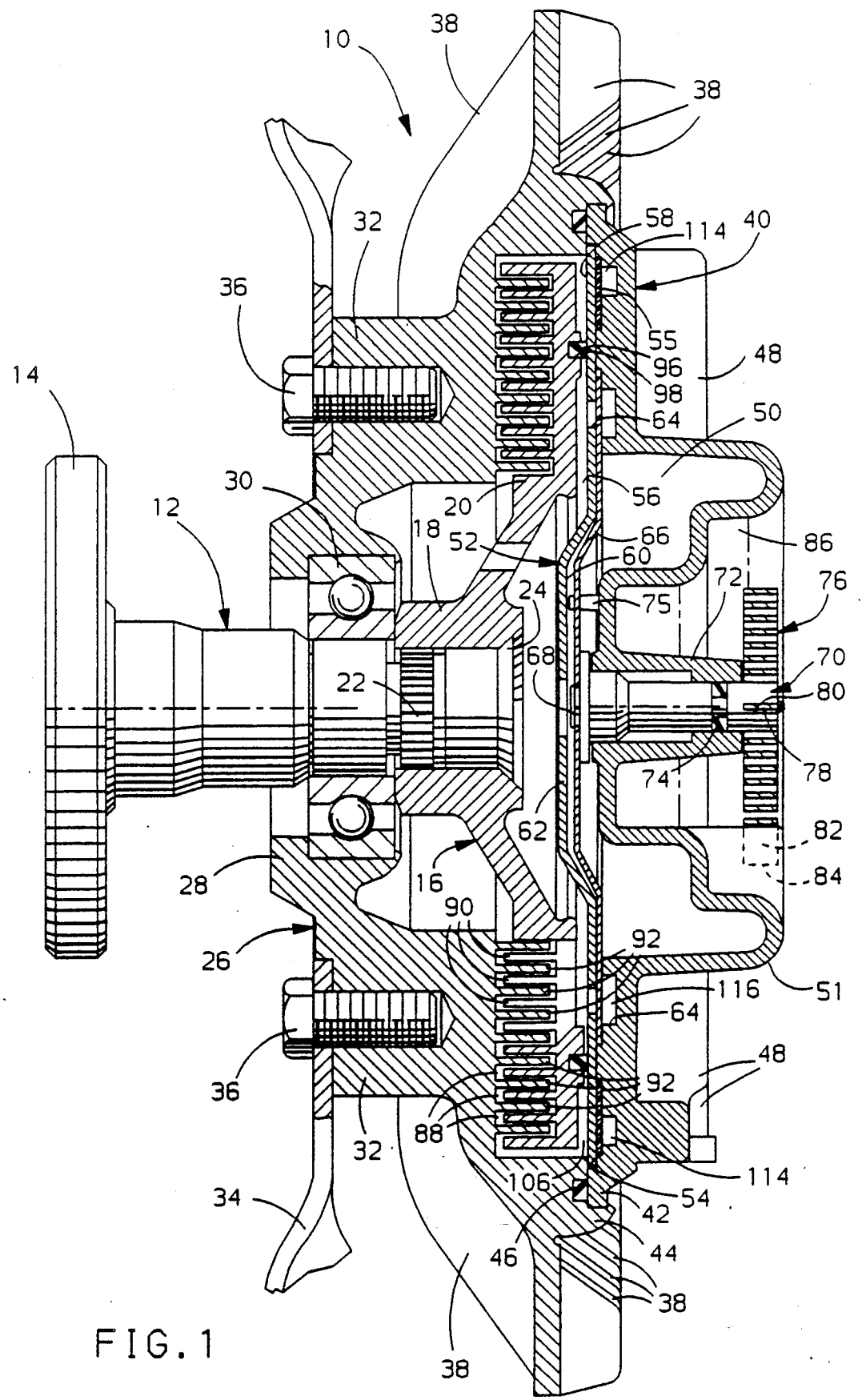
FIG. 1 is an axial view of an assembled viscous fluid clutch and attached fan incorporating a cover having fluid return channels according to the present invention.

A viscous fluid clutch indicated generally at 10 is illustrated in FIG. 1. The clutch 10 includes a rotatably driven input shaft indicated generally at 12. The input shaft 12, which can be provided with multiple steps as illustrated in FIG. 1, preferably terminates at its first or innermost end in a flange 14. The flange 14 is typically secured to a conventional engine water pump (not illustrated) to drive the clutch 10 as described below.

A clutch plate indicated generally at 16 includes a central hub portion 18 and an annular disk portion 20. The central hub portion 18 receives a knurled or serrated portion 22 of the input shaft 12 to provide an interference fit between the clutch plate 16 on the shaft 12. In this manner, the rotation of the input shaft 12 causes rotation of the clutch plate 16. A second end of the input shaft 12 can be machined as indicated at 24 to retain the clutch plate 16 on the input shaft 12. It is appreciated that other constructions, e.g., splining, can be utilized to drivingly connect the clutch plate 16 to the input shaft 12.

A housing indicated generally at 26 is a dished member having a hub portion 28 rotatably mounted on the input shaft 12 by an inner race of a bearing set 30. A plurality of bosses 32 is formed on the exterior surface of the housing 26. A multi-bladed fan 34, partially illustrated in FIG. 1, is attached by threaded fasteners 36 to the bosses 32. A plurality of fins 38 is provided on the outer surface of the housing 26 to dissipate heat transferred from a viscous fluid (not illustrated) contained inside the clutch 10.

A cover indicated generally at 40 is a dished member having an annular outer edge 42 secured to the housing 26 by an annular retainer lip 44 spun over from the material at the outer periphery of the housing 26. An annular seal 46 is interposed between the edge 42 and a front face of the housing 26 to prevent leakage from the interior of the clutch 10. A plurality of fins 48 is provided on the outer surface of the cover 40 to dissipate heat transferred from the fluid. A fluid reservoir 50 is formed as an annular channel or chamber in the interior surface of the cover 40 and bounded by a raised, annular reservoir-defining portion 51.

A disk-like pump plate indicated generally at 52 is installed in the interior of the clutch 10. The pump plate 52 is positioned on a shoulder 54 of the cover 40 and then drivingly secured between the housing 26 and the cover 40 when the clutch 10 is assembled. The pump plate 52 separates a working chamber 56 from the fluid reservoir 50. In the view of FIG. 1, the working chamber 56 is the interior volume of the clutch 10 to the left of the pump plate 52. For purposes of this specification, a first or rear surface 58 of the pump plate 52 is in communication with the working chamber 56 and a second or front surface 60 of the pump plate 52 is mounted on the shoulder 54 and in communication with the reservoir 50. If desired, an annular gasket 55 can be positioned between the pump plate 52 and the cover 40 to enhance the seal against fluid leakage. The pump plate 52 includes a central depression 62 which is fitted into the hub portion 18 of the clutch plate 16.

Figure 3:
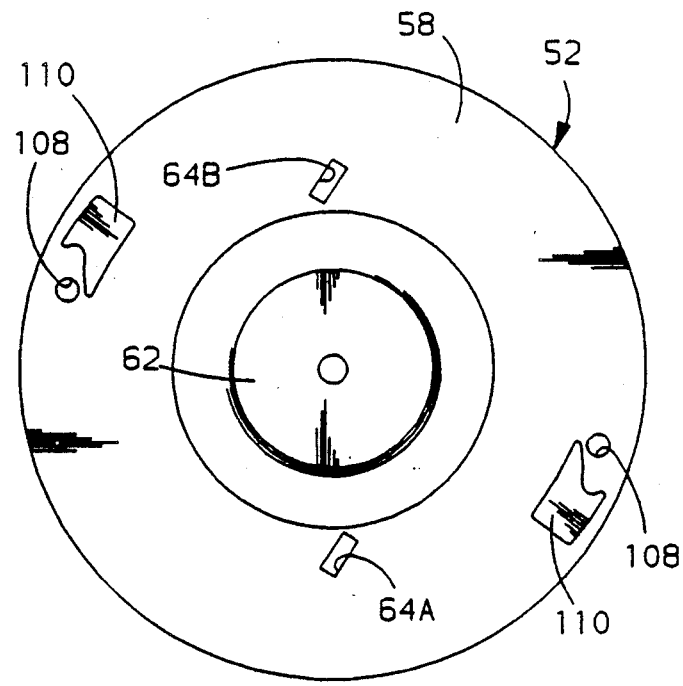
FIG. 3 is a reduced rear elevational view of the pump plate, removed from the clutch of FIGS. 1 and 2 for purposes of clarity of illustration, illustrating a pair of fill openings, and a pair of orifices and their respective wipers.

A pair of diametrically opposed fill openings 64 are provided in the portion of the pump plate 52 (FIG. 3) radially outbound of the depression 62 and radially aligned with the reservoir 50. Hydraulic pressure causes the flow of fluid through the fill openings 64 from the reservoir 50 into the working chamber 56 as described below.

A rotatable control arm 66 controls the fluid flow into the working chamber 56 by covering and uncovering the fill openings 64. The control arm 66 is drivingly connected to a squared end 68 of a shaft 70 rotatably mounted in a tubular hub 72 formed in the cover 40. An O-ring seal 74 is mounted in an annular groove in the shaft 70 and makes peripheral contact with the inner wall of the hub 72 to prevent fluid leakage to the exterior of the clutch 10. Rotational movement of the control arm 66 is limited by stops 75 formed in the reservoir 50.

A bimetallic coil indicated generally at 76 is mounted at a first end 78 in a slot 80 on the forward end of the shaft 70. A second end 82 of the bimetallic coil 76 is mounted in a slot 84 formed in the exterior of the cover 40. Preferably, the bimetallic coil 76 is recessed within a cavity 86 surrounding the hub 72. The bimetallic coil 76 responds to the ambient air temperature surrounding the cover 40. An increase in air temperature causes the coil 76 to expand, thereby rotating the shaft 70 and the control arm 66 to uncover the fill openings 64 in the pump plate 52. When the air temperature has decreased to a predetermined level, the bimetallic coil 76 contracts, causing the shaft 70 and control arm 66 to rotate back to their original positions, thereby covering the fill openings 64 in the pump plate 52 and blocking fluid flow.

A fluid shear zone 88 is formed in the space between interleaved concentric annular lands or ridges 90 formed on a rear or inner surface of the disk portion 20 of the clutch plate 16 and corresponding concentric annular lands or ridges 92 formed on an interior surface of the housing 26. Fluid sheared in the shear zone 88 transmits input torque from the rotatably driven clutch plate 16 to provide hydraulic drive of the housing 26 and the attached fan 34.

Figure 2:
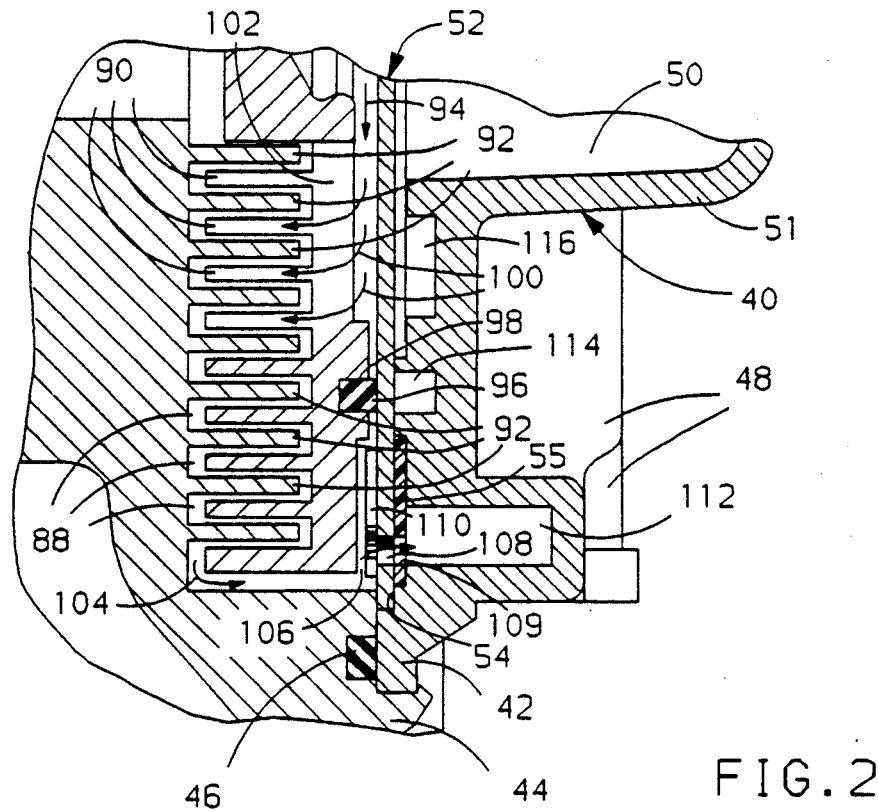
FIG. 2 is an enlarged view of a portion of the clutch of FIG. 1 wherein the pump plate has been rotated to illustrate fluid flow from a pumping chamber through orifices to a fluid accumulator formed in the cover.

Fluid flow through the shear zone 88 is illustrated best in FIG. 2. When the control arm 66 is rotated to uncover the fill openings 64, fluid flows from the reservoir 50 into the working chamber 56. Centrifugal forces of the rotating clutch 10 direct the fluid into a radial flow as indicated at directional arrow 94 between the pump plate 52 and the clutch plate 16. A blocking ring 96, preferably formed from polytetrafluoroethylene or a similar material, is provided in an annular groove 98 in a front surface of the clutch plate 16. Radial flow 94 encounters the blocking ring 96 and is redirected to axial flow indicated at directional arrows 100 to flow through a plurality of passages 102 provided in the ridges 90 of the disk portion 20 of the clutch plate 16. Centrifugal forces cause the fluid to be dispersed radially outwardly throughout the shear zone 88. Fluid friction in the shear zone 88 transmits the rotation of the clutch plate 16 to the housing 26. As the housing 26 rotates, the attached fan 34 is rotated to draw cooling air through a radiator (not illustrated) and cool an internal combustion engine in a well-known manner.

Fluid exits the shear zone 88 as indicated at directional arrow 104 into an annular pumping chamber 106 formed and bounded by the clutch plate 16, the pump plate 52 and the blocking ring 96. Fluid is pumped from the pumping chamber 106 back to the reservoir 50 through a pair of diametrically opposed orifices 108 provided in the pump plate 52 and aligned openings 109 in the gasket 55. As illustrated best in FIG. 3, a wiper 110 is provided at each orifice 108 to enhance fluid flow from the pumping chamber 106 through the orifices 108 in a well-known manner.

Figure 4:
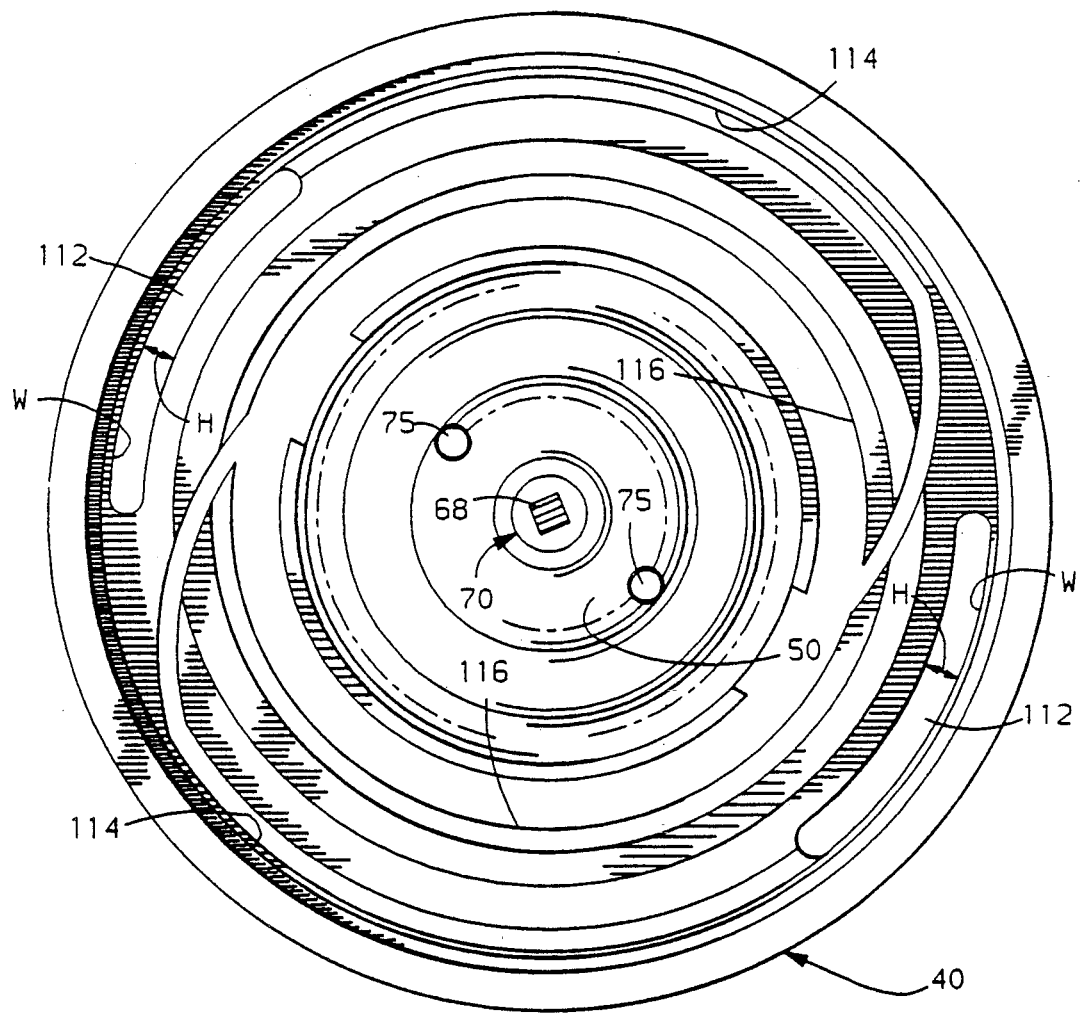
FIG. 4 is an elevational view of an interior surface of the present cover, removed from the clutch of FIGS. 1 and 2 for purposes of clarity of illustration, illustrating a fluid return path comprising fluid accumulators, non-radial channels and an annular reservoir.

The interior surface of the cover 40 includes channel means for directing return fluid to the reservoir 50 and for preventing the migration of fluid from the reservoir 50 through the orifices 108 into the shear zone 88 when the clutch 10 is at rest. As illustrated best in FIG. 4, the interior surface of the cover 40 includes a pair of diametrically opposed fluid accumulators 112. Each fluid accumulator 112, formed as an arcuate groove, is positioned radially outbound of the reservoir 50 and aligned with a respective orifice 108 when the cover 40 is secured to the housing 26. Preferably, the radial height indicated at H (FIG. 4) for each accumulator 112 is such that the outer wall W is positioned at a greater radial distance than the respective orifice 108.

An arcuate or non-radial channel 114 begins at each accumulator 112 and terminates at an annular spillway 116 which encircles the reservoir 50. Preferably, each channel 114 is radially aligned with the outer wall W of a respective accumulator 112 and is formed at a constant radius for at least the first 90°. After the first 90°, each channel 114 curves inwardly to intersect the spillway 116. As illustrated best in FIG. 2, the depth of each accumulator 112 is preferably more than the depth of a respective respective channel 114. The depth of the spillway 116 is preferably equal to the depth of the channels 114, and the depth of the reservoir 50 is greater than the depth of the spillway 116.

The cross-sectional area of each channel 114 must be sufficient to accommodate fluid flow for conventional viscous fluids used in friction drive clutches. The cross-sectional area of the accumulator 112 must be at least equal to the cross-sectional area of each channel 114. Also, the cross-sectional area of the accumulators 112 must be at least equal to the area of each orifice 108.

In operation, fluid exiting the pumping chamber 106 is pumped through the orifices 108 and received in a respective accumulator 112. Centrifugal forces of the rotating clutch 10 force the fluid to the outer wall W. As the fluid level increases in the accumulator 112, the fluid pressure becomes greater than the fluid pressure in the reservoir 50, creating centripetal forces which pump fluid through the channels 114 to the spillway 116 and the reservoir 50.

Two benefits are gained as fluid travels through the accumulators 112 and channels 114. First, return fluid flowing from the pumping chamber 106 to the reservoir 50 is controlled along a closed path to ensure that all fluid in the clutch 10 circulates, thereby improving fluid heat distribution. Many prior art designs included pockets or cavities which may have blocked some fluid from circulation. Heat transfer away from the fluid through the present cover 40 is improved due to the controlled return path to the reservoir 50 provided by the accumulators 112, the channels 114 and the spillway 116.

The second benefit gained by the present fluid return path is the elimination of migrating fluid from the reservoir 50 to the shear zone 88 when the clutch 10 stops rotating (static mode). Centripetal forces pump the majority of fluid from the channels 114 to the reservoir 50. Fluid stored in the reservoir 50 cannot return to the accumulators 112 due to the geometry of the channels 114. Any fluid remaining along the length of the channels 114 can migrate back to the accumulators 112. Preferably, the fluid volume capacity in a channel 114 is less than the fluid volume capacity of a respective accumulator 112. Due to the location of an orifice 108 with respect to the outer wall W of the accumulator 112, no substantial quantity of fluid overflows through an orifice 108 back into the pumping chamber 106.

When a vehicle is traveling at highway speeds and then suddenly comes to a stop (e.g., after exiting a freeway), it is desirable to have the clutch 10 engage and rotate the fan 34 to provide a cooling airflow through the engine compartment. This engagement is desirable even though the bimetallic coil 76 does not react to rotate the control arm 66 to permit fluid flow from the reservoir 50 to the working chamber 56. In such circumstances, the present cover 40 can accommodate this cooling requirement as fluid travels from the reservoir 50 through the channels 114, accumulators 112 and orifices 108 to reach the shear zone 88 when the clutch 10 is rotating, i.e., dynamic mode. Since no mechanical value elements are utilized, fluid can flow from the reservoir 50 to the shear zone 88 due to the fluid pressures inside the clutch 10.

The present cover 40 includes fluid return channel means leading to a reservoir 50 which prevents migration of fluid back into a shear zone 88 of the clutch 10 in the static mode fluid. The fluid return channel means relies upon the geometry and construction of fluid accumulators 112 and channels 114 to prevent unwanted return flow without the use of mechanical valves. Accordingly, unwanted high-speed fan rotation is eliminated from a clutch 10 which has been at rest and wherein the viscous fluid has achieved equilibrium.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A viscous fluid clutch comprising:
 (a) an input shaft;
 (b) a clutch plate driven by the input shaft;
 (c) housing means having a hollow interior containing the input shaft and the clutch plate;
 (d) a pump plate internally mounted in the housing means to separate a reservoir formed in the housing means from a working chamber;
 (e) a predetermined volume of viscous fluid stored in the reservoir which enters the working chamber through controlled fill openings provided in the pump plate and returns to the reservoir through orifices provided in the pump plate radially outbound of the fill openings; and
 (f) fluid return channel means formed in the housing means for directing fluid to the reservoir after it passes through the pump plate orifices, the return channel means including
  (i) a fluid accumulator formed in an interior surface of the housing means and aligned with a respective orifice; and
  (ii) a respective non-radial channel formed in the interior surface of the housing means beginning at each accumulator and terminating at the reservoir, wherein each non-radial channel is radially aligned with a radially outermost dimension of the fluid accumulator and is formed at a constant radius for at least the first 90°.

2. The clutch specified in claim 1 wherein the fluid volume capacity of an accumulator exceeds the fluid volume capacity of a respective channel.

3. The clutch specified in claim 1 including a recessed spillway formed in the housing means encircling the reservoir and receiving a terminating end of each non-radial channel.

4. The clutch specified in claim 1 wherein the depth of each accumulator is greater than the depth of each respective channel.

5. A cover for a viscous fluid clutch having a working chamber, comprising:
 (a) a dished member having inner and outer surfaces;
 (b) an annular shoulder formed along the inner surface circumference for seating a pump plate;
 (c) accumulator means formed in the cover inner surface for receiving fluid from the working chamber;
 (d) reservoir means formed in the cover inner surface for storing fluid; and
 (e) non-radial channel means formed in the cover inner surface beginning at the accumulator means and terminating at the reservoir means, wherein the channel means is formed at a constant radius aligned with a radially outermost dimension of the accumulator means for at least 90°, whereby centripetal forces present during a dynamic mode of the clutch pump fluid from the accumulator means through the channel means to the reservoir means, and whereby the geometry of the channel means prevents the migration of fluid from the reservoir to the accumulator means when the clutch is in a static mode.

6. The cover specified in claim 5 wherein:

(a) the accumulator means is radially aligned with orifices in a pump plate of the clutch; and (b) the reservoir means is radially aligned with fill openings in the pump plate.

7. A method of preventing the migration of a viscous fluid in a fluid coupling from a reservoir to a fluid shear zone, wherein the shear zone is in communication with a pumping chamber, the method comprising the steps of:

(a) providing a cover having a cavity forming the reservoir;

(b) mounting a pump plate on the cover to separate the working chamber from the reservoir, the pump plate including orifices in communication with the pumping chamber;

(c) forming accumulator means in the cover for receiving fluid from the pumping chamber through the orifices;

(d) forming non-radial channel means in the cover beginning at the accumulator means and terminating at the reservoir, the channel means formed at a constant radius aligned with a radially outermost dimension of the accumulator means for at least 90° so that centripetal forces of the rotating coupling pump fluid from the accumulator means through the channel means to the reservoir and wherein the geometry of the channel means prevents fluid migration from the reservoir to the accumulator means when the coupling has stopped rotating.

* * * * *